US012712965B1

(12) United States Patent
Shott et al.

(10) Patent No.: US 12,712,965 B1
(45) Date of Patent: Aug. 18, 2026

(54) SELECTIVE CALL NOTIFICATIONS ON MULTIPLE APPLICATIONS

(71) Applicant: Meta Platforms, Inc., Menlo Park, CA (US)

(72) Inventors: Jennifer Marie Shott, San Rafael, CA (US); Pradeep George Mathias, Berkeley, CA (US); Qi Chen, Santa Clara, CA (US); Yuhe Shao, Bothell, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 835 days.

(21) Appl. No.: 18/094,101

(22) Filed: Jan. 6, 2023

(51) Int. Cl.
*H04M 3/42* (2006.01)
*H04M 1/72448* (2021.01)

(52) U.S. Cl.
CPC ... *H04M 3/42051* (2013.01); *H04M 1/72448* (2021.01)

(58) Field of Classification Search
CPC ...................... H04M 3/42051; H04M 1/72448
See application file for complete search history.

(56) References Cited

U.S. PATENT DOCUMENTS

| | | | | |
|---|---|---|---|---|
| 8,819,268 | B1 * | 8/2014 | Sauer | H04L 65/00 709/248 |
| 9,264,528 | B2 * | 2/2016 | Kim | H04M 1/6091 |
| 10,412,206 | B1 * | 9/2019 | Liang | H04M 3/42068 |
| 12,126,871 | B1 * | 10/2024 | Bajaj | H04N 21/47 |
| 2016/0381214 | A1 * | 12/2016 | Messenger | H04M 15/70 455/415 |
| 2017/0272568 | A1 * | 9/2017 | Bovis | H04W 4/027 |
| 2018/0375990 | A1 * | 12/2018 | Chandrasekaran | H04L 51/224 |
| 2021/0144244 | A1 * | 5/2021 | Duarte | G06F 3/0481 |
| 2021/0400131 | A1 * | 12/2021 | Chang | G06F 3/04886 |
| 2022/0224789 | A1 * | 7/2022 | Abdollahian | G06F 3/0482 |
| 2022/0365795 | A1 * | 11/2022 | Fu | G06F 1/3234 |
| 2023/0155991 | A1 * | 5/2023 | Johnson | H04W 68/005 726/5 |
| 2023/0216990 | A1 * | 7/2023 | Fang | H04N 21/42203 348/14.09 |

* cited by examiner

*Primary Examiner* — Angelica Perez
(74) *Attorney, Agent, or Firm* — EVERSHEDS SUTHERLAND (US) LLP

(57) ABSTRACT

Systems, methods, and non-transitory computer readable media can be configured to perform operations comprising receiving, by a computing system, an incoming call; selecting, by the computing system, an application of a plurality of applications having calling functionality and installed on a computing device of a user to provide at least one of a notification of the incoming call or a notification of a missed call associated with the incoming call; and causing, by the computing system, the application to provide at least one of the notification of the incoming call or the notification of the missed call.

14 Claims, 9 Drawing Sheets

Select an application of a plurality of applications having calling functionality and installed on a computing device of a user to provide at least one of a notification of the incoming call or a notification of a missed call associated with the incoming call
504

Cause the application to provide at least one of the notification of the incoming call or the notification of the missed call
506

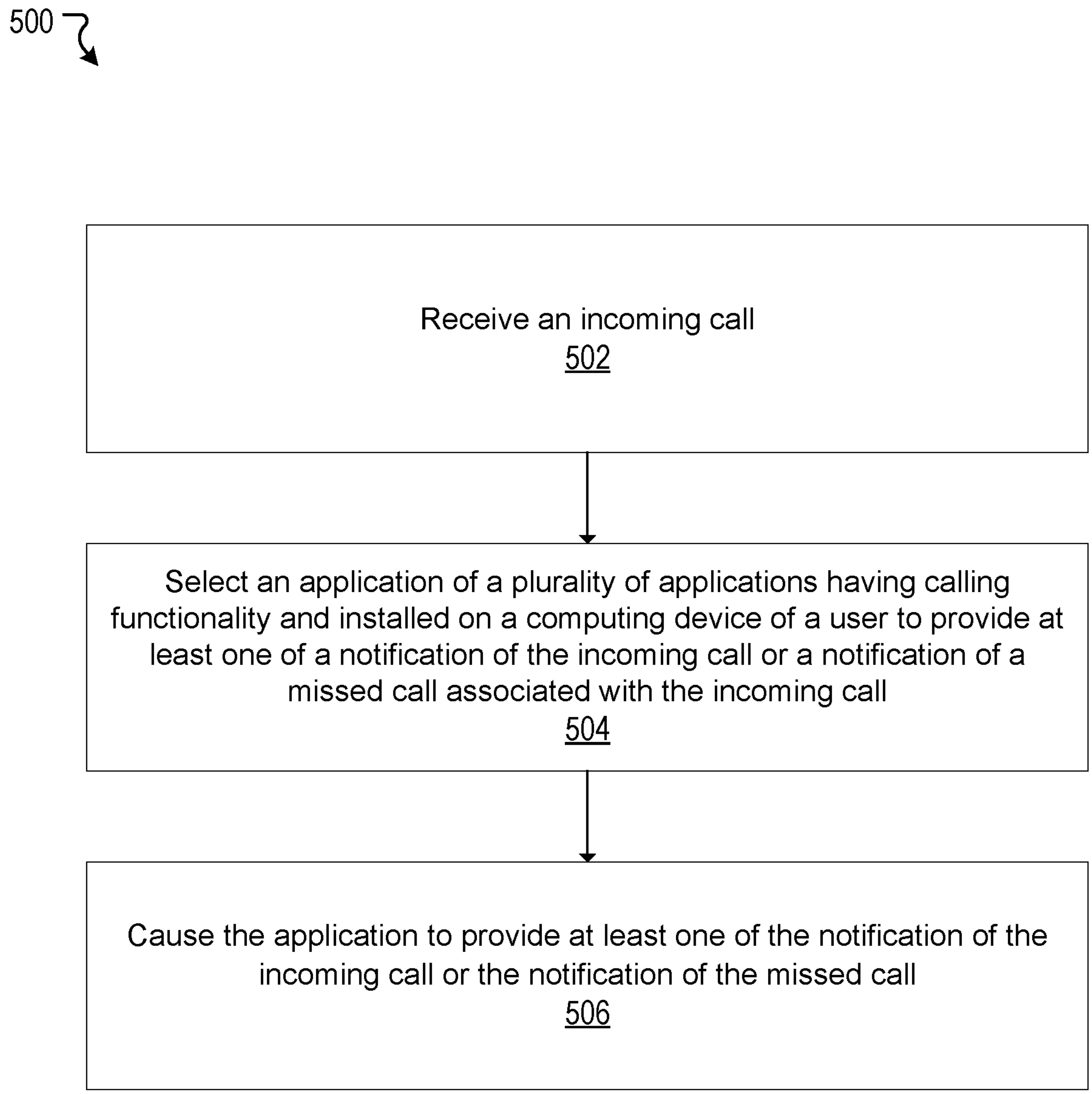

FIGURE 5

SELECTIVE CALL NOTIFICATIONS ON MULTIPLE APPLICATIONS

FIELD OF THE INVENTION

The present technology relates to the field of digital communications. More particularly, the present technology relates to selective provision of communication notifications on various applications and computing devices.

BACKGROUND

Today, people can utilize computing devices for a wide variety of purposes. For example, users can utilize computing devices to access a content sharing platform, such as a social networking system, or a communications platform, such as a messaging system. The users can utilize the computing devices to interact and communicate with one another in a variety of manners. For example, the computing devices can run applications associated with a social networking system and a messaging system to allow calling between or among users.

SUMMARY

Various embodiments of the present technology can include systems, methods, and non-transitory computer readable media configured to perform operations comprising receiving, by a computing system, an incoming call; selecting, by the computing system, an application of a plurality of applications having calling functionality and installed on a computing device of a user to provide at least one of a notification of the incoming call or a notification of a missed call associated with the incoming call; and causing, by the computing system, the application to provide at least one of the notification of the incoming call or the notification of the missed call.

In some embodiments, the selecting an application of the plurality of applications comprises: determining, by the computing system, if the user specified a preferred application, wherein the application to provide at least one of the notification of the incoming call or the notification of the missed call is the preferred application.

In some embodiments, the selecting an application of the plurality of applications comprises: determining, by the computing system, if the user has just one of a first application or a second application installed on the computing device, wherein the application to provide at least one of the notification of the incoming call or the notification of the missed call is the installed application of the first application or the second application.

In some embodiments, the selecting an application of the plurality of applications comprises: determining, by the computing system, if the user is active in an application, wherein the application to provide at least one of the notification of the incoming call or the notification of the missed call is the application in which the user is active.

In some embodiments, the selecting an application of the plurality of applications comprises at least one of: determining, by the computing system, that the user has not specified a preferred application; determining, by the computing system, that the user does not have just one of a first application or a second application installed on the computing device; or determining, by the computing system, that the user is not active in an application, wherein the application to provide at least one of the notification of the incoming call or the notification of the missed call is an application through which the incoming call was initiated on a computing device of a caller.

In some embodiments, the selecting an application of the plurality of applications comprises: determining, by the computing system, if an application has permission to use at least one of a camera or a microphone, wherein the application to provide at least one of the notification of the incoming call or the notification of the missed call is the application having the permission to use at least one of the camera or the microphone.

In some embodiments, the selecting an application of the plurality of applications comprises: determining, by the computing system, if an application has a higher recency score in comparison to other applications, wherein the application to provide at least one of the notification of the incoming call or the notification of the missed call is the application having the higher recency score.

In some embodiments, the selecting an application of the plurality of applications comprises: determining, by the computing system, if an application is consistent with a use case of an application that initiated the incoming call, wherein the application to provide at least one of the notification of the incoming call or the notification of the missed call is the application that is consistent with the use case of the application that initiated the incoming call.

In some embodiments, the causing the application to provide at least one of the notification of the incoming call or the notification of the missed call comprises: causing, by the computing system, provision of the notification of the incoming call on a first application of the plurality of applications; and causing, by the computing system, provision of the notification of the missed call on a second application of the plurality of applications.

In some embodiments, the notification of the incoming call is a ring.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIG. 5 illustrates an example method, according to an embodiment of the present technology.

Figure 1:
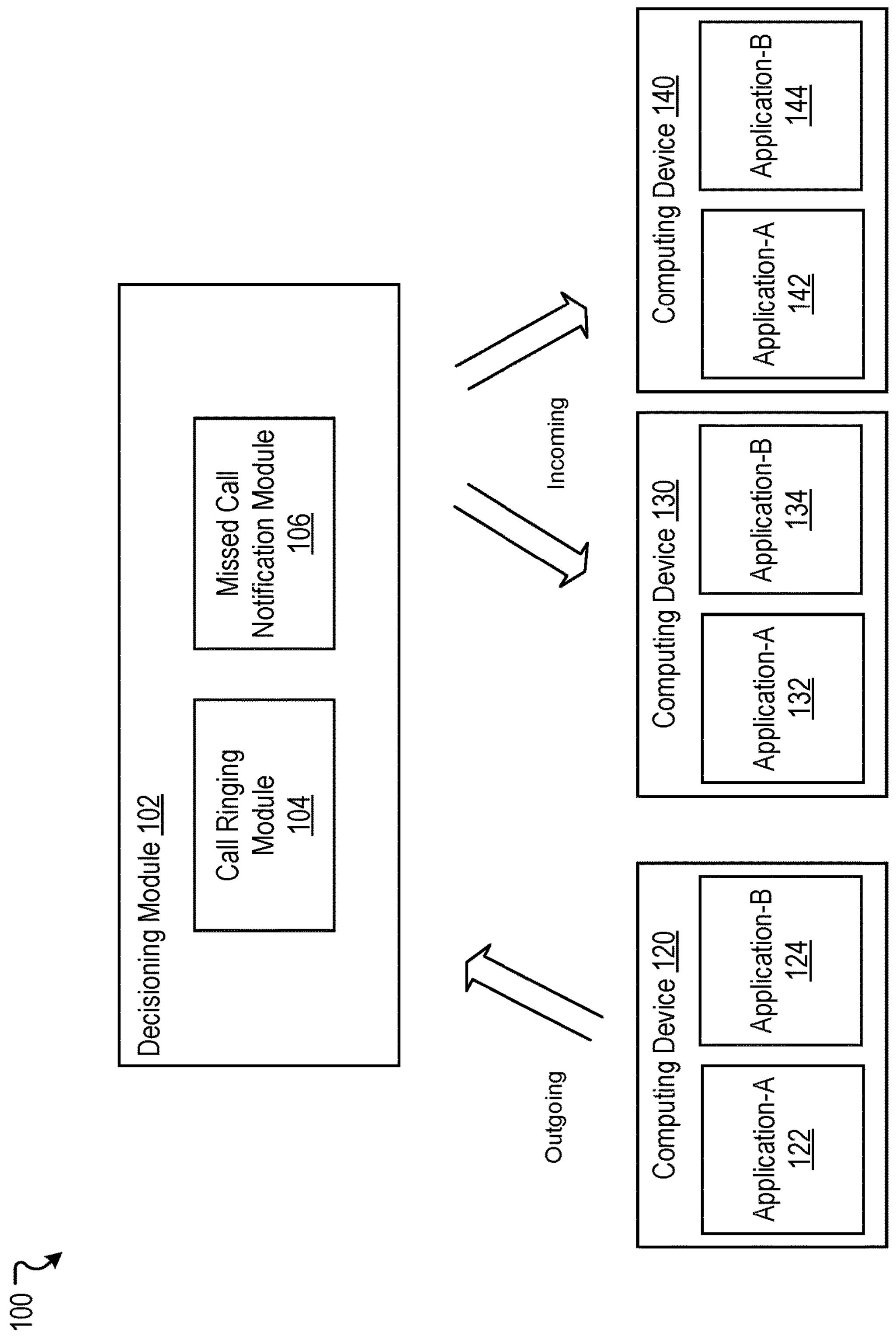
FIG. 1 illustrates an example system including a decisioning module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Today, people can utilize computing devices for a wide variety of purposes. For example, users can utilize computing devices to access a content sharing platform, such as a social networking system, or a communications platform, such as a messaging system. The users can utilize the computing devices to interact and communicate with one another in a variety of manners. For example, the computing devices can run applications associated with a social networking system and a messaging system to allow calling between or among users.

A computing device of a user can run a plurality of applications (or apps) that have calling functionality for interacting with a server system to initiate calls to other users and to receive calls from other users. In some instances, a user can have a variety of computing devices with each computing device running one or more applications that have calling functionality. Such computing devices can include mobile devices and non-mobile devices, such as smart-phones, laptops, tablets, desktop computers, watches, etc. Typically, an application with calling functionality installed on a computing device can communicate with a server that supports and manages calling between or among computing devices of different users. A call can be a communication between two users or a communication with more than two users. When a call is initiated to connect with a user, the server can deliver the call to a computing device of the user having one or more applications with calling functionality. To notify the user about the incoming call, an application on the computing device to which the incoming call is delivered will "ring" or otherwise notify the user about the incoming call. In response to the ring generated by the application, the user, if desired, can pick up the call using the application.

Conventional techniques that perform calling pose several disadvantages. For example, a computing device of a user can have multiple applications with calling functionality. If a user is using one application, the user may not know about an incoming call if the call is delivered to, or results in ringing of, other applications. As another example, a caller may use one application for making a call to a user while the user may use a different application to receive the call. The application used to make the call and the application used to receive the call may involve different user interfaces, different features and capabilities, and different user experiences overall. Accordingly, the caller and the user may be unable to have a shared or consistent calling experience. As yet another example, a user may prefer to receive incoming calls on a particular application with calling functionality. However, if a caller uses a different application to make a call to the user but the preferred application of the user is unable to receive the call, then the user may be undesirably forced to switch to the different application if it is already installed or download the different application if it is not already installed. As a related matter, conventional techniques may not allow a user to change preferences with regard to the application used for receiving calls. In this regard, the user may be unable at one time to select a particular application with calling functionality to receive calls and later to select a different application to receive calls.

In some conventional techniques, ringing on multiple applications with calling functionality on a computing device for an incoming call also can undesirably impact user experience. A user of the computing device may become confused or overwhelmed if multiple applications on the computing device simultaneously ring for the same incoming call. Further, when a user has multiple computing devices with each device having a plurality of applications with calling functionality, the problems associated with one computing device can be multiplied. Some computing devices are not appropriately designed to handle an incoming call that is received by multiple applications at the same time. In this regard, the operating system of some computing devices can unexpectedly drop an incoming call when a user selects an application from among the multiple applications to pick up the incoming call.

An improved approach rooted in computer technology overcomes the foregoing and other disadvantages associated with conventional approaches specifically arising in the realm of computer technology. In various embodiments, the present technology can selectively deliver an incoming call to, and ring, an application of a plurality of applications having calling functionality of a computing device of a user. As used herein, reference to delivery of an incoming call to an application of a computing device of a user can include notifying the user about the incoming call through ringing or other types of notifications generated by the application. The present technology can deliver an incoming call to and ring an application of a plurality of applications with calling functionality on a computing device based on various criteria or considerations. In some instances, an incoming call can ring an application when one or more criteria or considerations have been satisfied in relation to the application. For example, the incoming call can ring an application based on whether the application has been installed on the computing device of the user or the application has received permission from the user to use a camera, microphone, or other capability of the computing device for the call. As another example, an incoming call can ring a particular application based on whether a user has indicated a preference to receive calls or engage in communications with the application. As yet another example, an application of a plurality of applications that has the most features in common with an application used to initiate a call can be selected to ring. As yet a further example, to avoid disruption to a user, if the user is active in one application of a plurality of applications, that application can be prioritized to ring. The present technology also can selectively provide missed call notifications on applications on a computing device of a user when the user does not pick up an incoming call. In some instances, missed call notifications can be delivered to a particular application of a plurality of applications of a computing device based on the same or similar considerations and methodologies used to deliver incoming calls to a particular application of the computing device. More details relating to the present technology are provided herein.

FIG. 1 illustrates an example system 100 including a decisioning module 102, according to an embodiment of the present technology. The decisioning module 102 can selectively deliver a call to and cause the call to ring a particular application of a plurality of applications that are installed on a computing device of a user to whom the call is directed. The plurality of applications can have calling functionality to make and receive calls. When the user does not answer an incoming call, the decisioning module 102 can selectively deliver a missed call notification to a particular application of the plurality of applications. As used herein, a call (or incoming call) can include a one-on-one call involving two computing devices or a group call involving two or more computing devices. In general, a call can be associated with any type of mechanism or medium through which users can communicate with one another. A call can include only audio communications or both audio and video communications. Many variations are possible.

In some embodiments, the decisioning module 102 can be implemented on a server system that is in communication over a communications network with client computing devices 120, 130, 140 to implement the present technology. In some embodiments, some or all of the functionality of the decisioning module 102 can be performed by a server of the system 100. In some embodiments, some or all of the functionality of the decisioning module 102 can be performed by an application running on the client computing devices 120, 130, 140. In some embodiments, the functionality of the decisioning module 102 can be distributed between a server of the system 100 and an application running on the client computing devices 120, 130, 140. In some instances, the system 100 can include at least one data store (not shown) in communication with the decisioning module 102. The data store can maintain information required to support operation of the system and the decisioning module 102. For example, the data store can maintain information about selection by a user of a particular application having call functionality on which the user prefers to conduct communications and receive calls. As another example, the data store can maintain information about frequency, recency, and duration of usage by a user of a plurality of applications having call functionality. The system 100 can be associated with a suitable platform or system. For example, the system 100 can be implemented by a content sharing platform or system, such as a social networking system, or a communication platform or system, such as a messaging system. Although a social networking system may be referenced in various examples discussed herein, the present technology also applies to any type of messaging platform or system, content sharing platform or system, or the like. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the decisioning module 102 can be implemented in any suitable combinations.

The computing device 120 can include an application-A 122 and an application-B 124; the computing device 130 can include an application-A 132 and an application-B 134; and, the computing device 140 can include an application-A 142 and an application-B 144. The applications-A 122, 132, 142 and the applications-B 124, 134, 144 can be applications having calling functionality. As used herein, calling functionality associated with an application can include functionality, for example, to allow a user of the application to place outgoing calls, to receive incoming calls, and to provide notifications (e.g., rings) to the user about incoming calls as well as missed calls. In some embodiments, the applications-A 122, 132, 142 are instances of one application having calling functionality while the applications-B 124, 134, 144 are instances of another, different application having calling functionality. For example, the applications-A 122, 132, 142 can be applications of a first type while the applications-B 124, 134, 144 can be applications of a second type. For instance, the applications-A 122, 132, 142 can be applications associated with a social networking system (e.g., FACEBOOK® App) while the applications-B 124, 134, 144 can be applications associated with a messaging system (e.g., MESSENGER® App). In some embodiments, the applications-A 122, 132, 142 and the applications-B 124, 134, 144 are applications developed by or offered for download by the same organization or company. In some embodiments, the applications-A 122, 132, 142 and the applications-B 124, 134, 144 are applications that can be linked. For example, the application-A 122 and the application-B 124 of the computing device 120 can be linked such that authentication by a user to access both applications can be achieved through a common set of credentials (e.g., username, password). In some embodiments, the applications-A 122, 132, 142 and the applications-B 124, 134, 144 are applications that can be extensions of one another. Although two applications having calling functionality are included in each computing device of the computing devices 120, 130, 140 as shown as an example, each computing device can have any number of applications having calling functionality (e.g., one application, two applications, three applications, etc.). Further, each of the computing devices 120, 130, 140 can have a different number of applications.

In addition, although the three computing devices 120, 130, 140 are shown as an example, the present technology can be applied to any number of computing devices. In some embodiments, the computing device 120 can be controlled (or owned) by one user (e.g., a caller) and the computing devices 130, 140 can be controlled (or owned) by a different user (e.g., a callee). In some embodiments, the computing devices 130, 140 can be controlled or used by a plurality of users (e.g., family members). In accordance with the present technology, selection of an application of one or more applications on a computing device on which to ring for an incoming call or on which to provide a missed call notification can be determined on a per computing device basis. In this regard, in some embodiments, the selection of an application of the computing device 130 and selection of an application of the computing device 140 can be performed independently from one another. In some embodiments, the selected application of the computing device 130 and the selected application of the computing device 140 can be the same application. In some embodiments, the selected application of the computing device 130 and the selected application of the computing device 140 can be different applications.

As shown in the example of FIG. 1, the decisioning module 102 can receive an outgoing call initiated from the computing device 120. The outgoing call can be generated by the application-A 122 or the application-B 124. The decisioning module 102 can direct the call to a user of the computing device 130 and the computing device 140. In particular, a call ringing module 104 of the decisioning module 102 can determine which of the application-A 132 or the application-B 134 will ring as part of delivery of the call to the computing device 130. The user can pick up the call through appropriate interaction with the application (the application-A 132 or the application-B 134) that was rung.

If the user does not pick up the call, the decisioning module 102 can direct a missed call notification to the computing device 130 for the user. In particular, a missed call notification module 106 of the decisioning module 102 can determine which of the application-A 132 or the application-B 134 will present a missed call notification for the user. In some embodiments, the call ringing module 104 and the missed call notification module 106 can implement various rule based or algorithmic techniques to deliver ringing for an incoming call or a notification for a missed call, as discussed in more detail herein.

In some embodiments, the call ringing module 104 and the missed call notification module 106 can utilize one or more appropriately trained machine learning models to determine which application of a computing device of a user rings for an incoming call and provides missed call notifications when the incoming call is not picked up. The machine learning models can be trained by various types of training data. For example, the machine learning models can be trained based on feature data, such as talk time, application presence, and application feature usage. Talk time can be associated with amounts of time that a user uses a particular application for conducting calls. Application presence can be associated with amounts of time that a user is active or present on a particular application. Application feature usage can be associated with specific features or capabilities supported by a particular application (e.g., augmented reality (AR) effects, background blurring, interactive games during a call, etc.) that are used by a user. Other types of training data are possible. The machine learning models can be trained to infer that a particular application of a plurality of applications is preferred for a user based on such feature data.

Figure 2A:
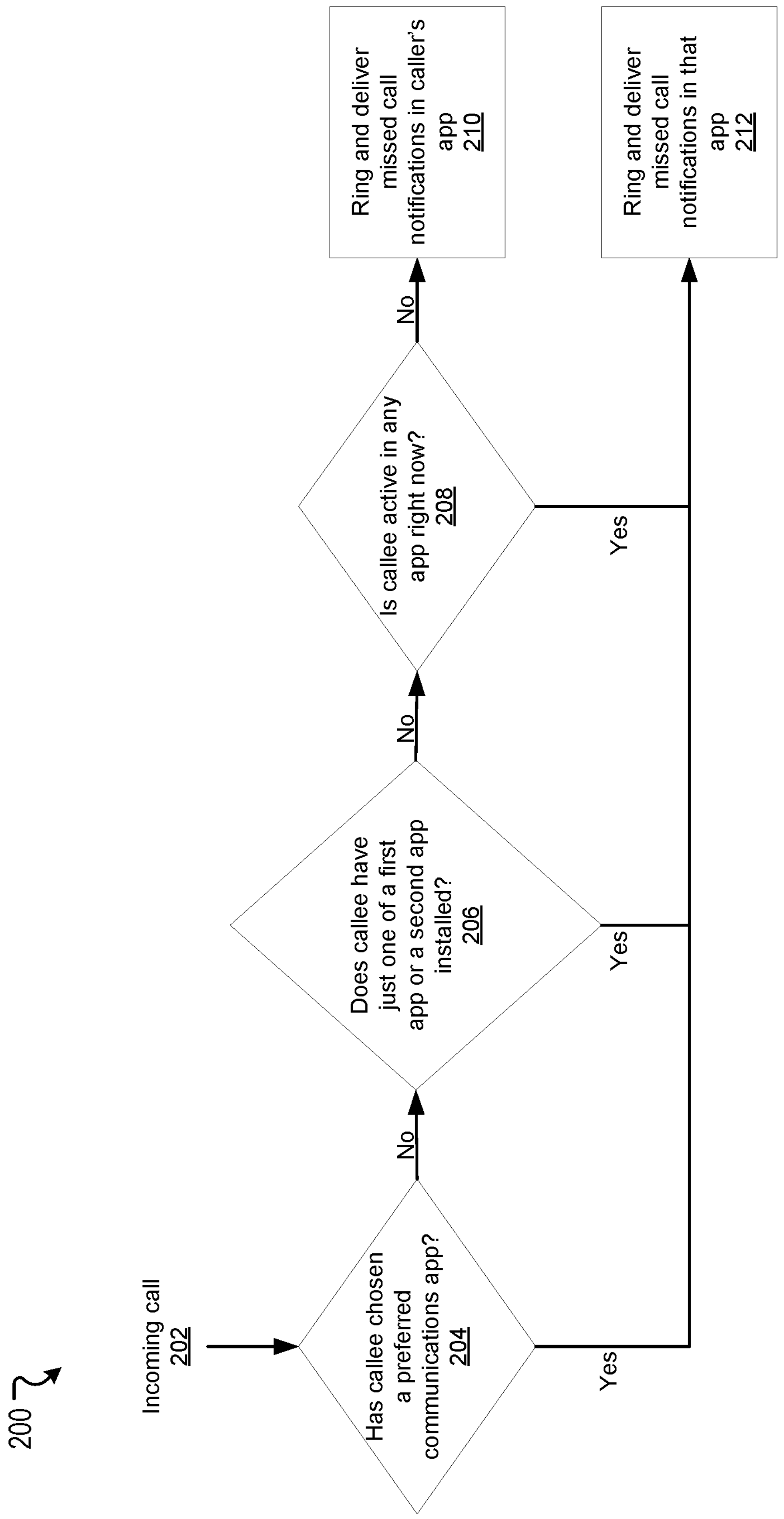
FIG. 2A illustrates an example flow, according to an embodiment of the present technology.

FIG. 2A illustrates an example flow 200 to selectively determine an application of a plurality of applications with calling functionality of a computing device of a user (or callee) to ring for an incoming call or to notify about a missed incoming call, according to an embodiment of the present technology. In some embodiments, the flow 200 can be performed or implemented by the call ringing module 104 or the missed call notification module 106 of the decisioning module 102. At 202, an incoming call can be received. The incoming call can be initiated by a caller using a computing device, such as the computing device 120. The computing device of the caller can include one or more applications having calling functionality, such as the application-A 122 or the application-B 124. An application on the computing device of the caller can have been used to initiate the incoming call. The call can be directed to a callee having a computing device, such as the computing device 130 (or the computing device 140). The flow 200 can select an application of a plurality of applications of the computing device of the callee to ring or otherwise notify the callee about the call. In addition, the flow 200 can select an application of a plurality of applications of the computing device of the callee to provide a missed call notification about an incoming call if the callee did not pick up the incoming call. For example, the plurality of applications of the computing device of the callee can include the application-A 132 and the application-B 134.

Figure 4:
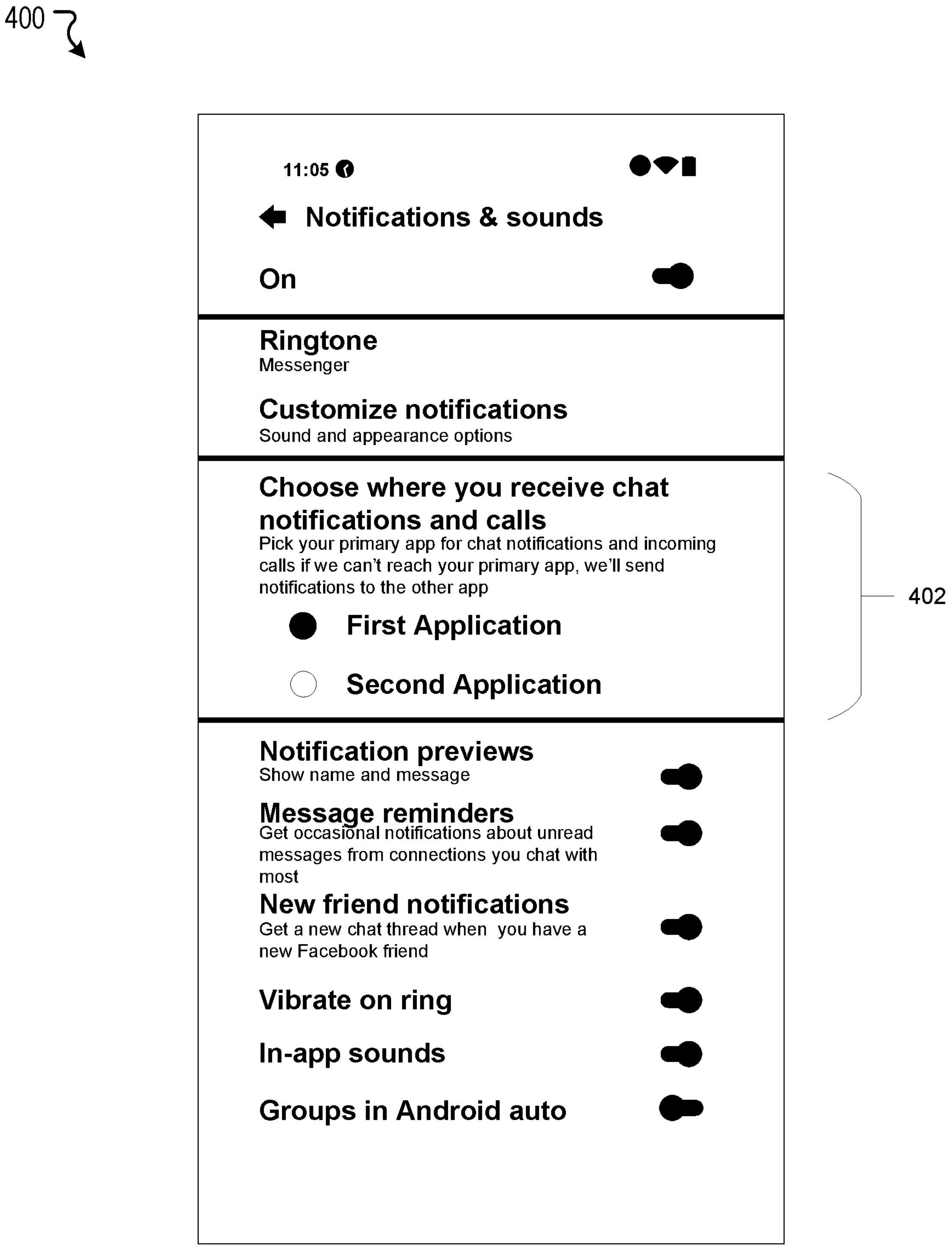
FIG. 4 illustrates an example user interface, according to an embodiment of the present technology.

At 204, it can be determined whether the callee has chosen a preferred communications application having calling functionality through which to communicate (e.g., participate in calls) with others. FIG. 4 illustrates an example interface 400 to allow a user to select a preferred communications application, according to an embodiment of the present technology. In some embodiments, the interface 400 can be generated by one or more applications with calling functionality on a computing device of a user. In some embodiments, the interface 400 can be generated by the decisioning module 102 for presentation on a computing device of a user. The interface 400 can appear after appropriate navigation through user settings or a control panel provided by the application or the decisioning module 102. The interface 400 can include a section 402 that prompts the user to select a first application or a second application (or more applications) to ring for an incoming call, to provide notification of a missed call, or both. In some embodiments, the first application can be an application that is associated with a social networking system while the second application can be an application that is associated with a messaging system. In some embodiments, the first application and the second application can be other types of different applications. Selection of the first application or the second application by appropriate input to the interface 400 by the user can cause rings, missed call notifications, or both to be delivered to the selected application.

As shown in FIG. 2A, if the callee has chosen a preferred communications application, the flow 200 can proceed to 212. At 212, ringing and missed call notifications can be delivered in the communications application preferred by the callee. If the callee has not chosen a preferred communications application, the flow 200 can proceed to 206. At 206, it can be determined whether a computing device of the callee has only one application installed between a first application having calling functionality and a second application having calling functionality.

If the computing device of the callee has only one application installed between the first application and the second application, the flow 200 can proceed to 212. At 212, ringing and missed call notifications can be delivered in the one application that is installed on the computing device of the callee. If the computing device of the callee does not have only one application installed between the first application and the second application, the flow 200 can proceed to 208. At 208, it can be determined whether the callee is active in any application with calling functionality on the computing device of the callee during a window of time. In some embodiments, a callee can be considered to be active in an application when, for example, the callee is scrolling through content or data provided by the application, the callee is using functionality provided by the application, the application is foregrounded in an interface of the computing device of the user, etc. The application can communicate with the decisioning module 102 so that the decisioning module 102 can determine if and when the user is active in the application. In some embodiments, the window of time can be a time during which the incoming call is to be delivered to the callee. In some embodiments, the window of time can be the time during which the incoming call is to be delivered to the callee and a predetermined amount of time prior to initiation of the incoming call. If the callee is active in an application with calling functionality on the computing device of the callee during the window of time, the flow 200 can proceed to 212. At 212, ringing and missed call notifications can be delivered in the application in which the callee is active. If the callee is not active in an application with calling functionality on the computing device of the callee during the window of time, the flow 200 can proceed to 210. At 210, ringing and missed call notifications can be delivered in the application on the computing device of the callee that was used by the caller to initiate the incoming call.

The flows discussed herein, including the flow 200, are examples. It should be understood that there can be additional, fewer, or alternative steps performed in similar or alternative orders. For example, as shown, the flow 200 performs steps 204, 206, 208 in a certain order. However, in some embodiments, the steps 204, 206, 208 can be performed in other orders. For example, step 206 can be performed before steps 204, 208. As another example, step 208 can be performed before steps 204, 206. Many variations are possible for all of the flows discussed herein.

Figure 2B:
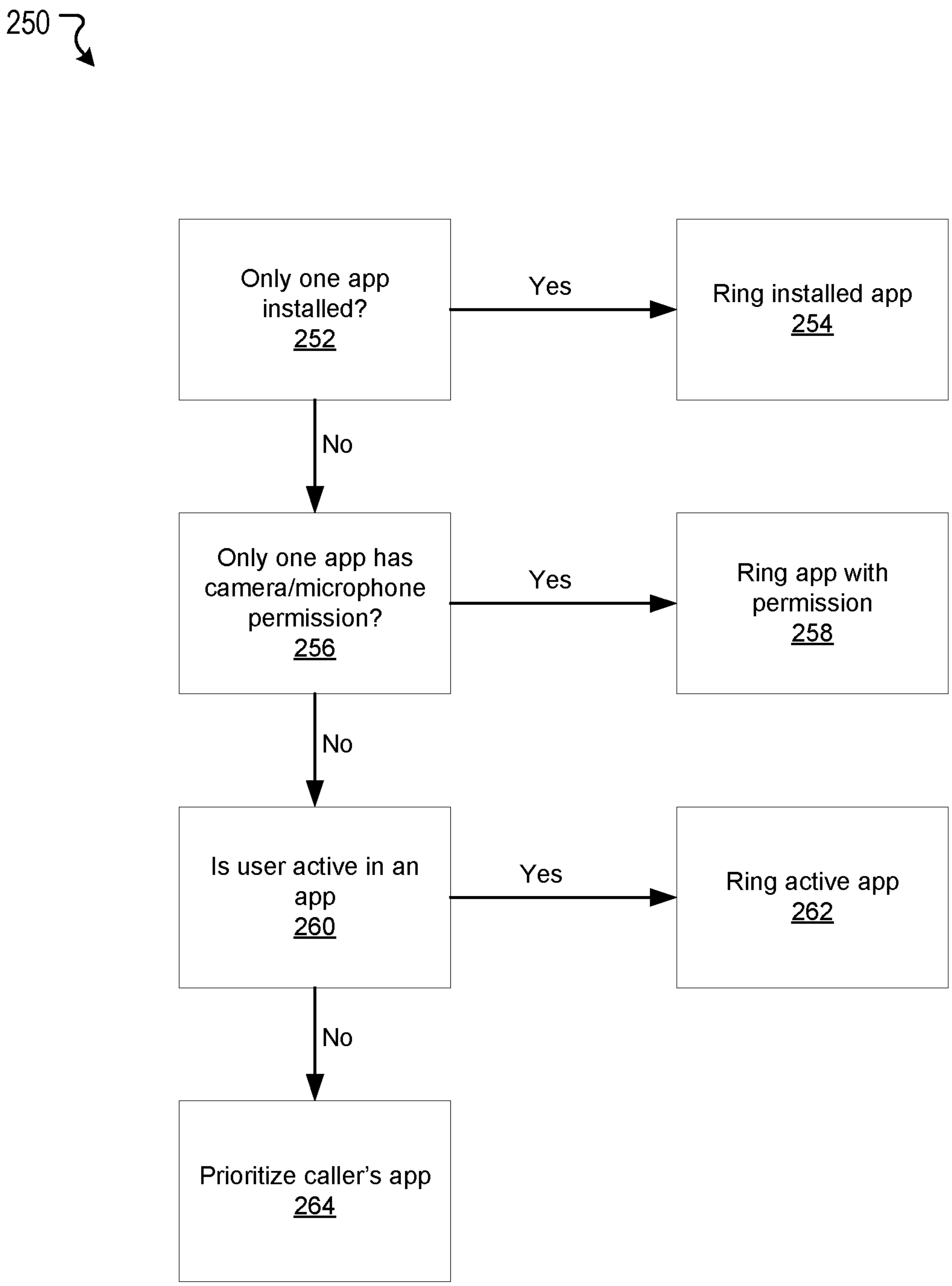
FIG. 2B illustrates an example flow, according to an embodiment of the present technology.

FIG. 2B illustrates an example flow 250 to selectively determine an application of a plurality of applications with calling functionality of a computing device of a user (or callee) to ring for an incoming call initiated by a caller, according to an embodiment of the present technology. In some embodiments, the flow 250 can be performed or implemented by the call ringing module 104 of the decisioning module 102. At 252, it can be determined if only one application having call functionality is installed on a computing device of the user. If only one application is installed on a computing device of the user, the flow 250 can proceed to 254. At 254, the one application installed on the computing device of the user can be rung for the incoming call. If a plurality of applications with call functionality are installed on a computing device of the user, the flow 250 can proceed to 256. At 256, it can be determined if only one application of the plurality of applications has received permission to use a camera, microphone, or other communication capability of the computing device. If one application of the plurality of applications has received permission to use a camera, microphone, or other communication capability of the computing device, the flow 250 can proceed to 258. At 258, the application that received such permissions can be rung for the incoming call. If not only one application of the plurality of applications has received permission to use a camera, microphone, or other communication capability of the computing device, the flow 250 can proceed to 260. At 260, it can be determined if the user is active in an application. If the user is active in an application, the flow 250 can proceed to 262. At 262, the application in which the user is active can be rung. If the user is not active in an application, the flow 250 can proceed to 264. At 264, the same application on the computing device of the user that was used on a computing device of the caller to initiate the call can be rung for the incoming call.

Figure 3A:
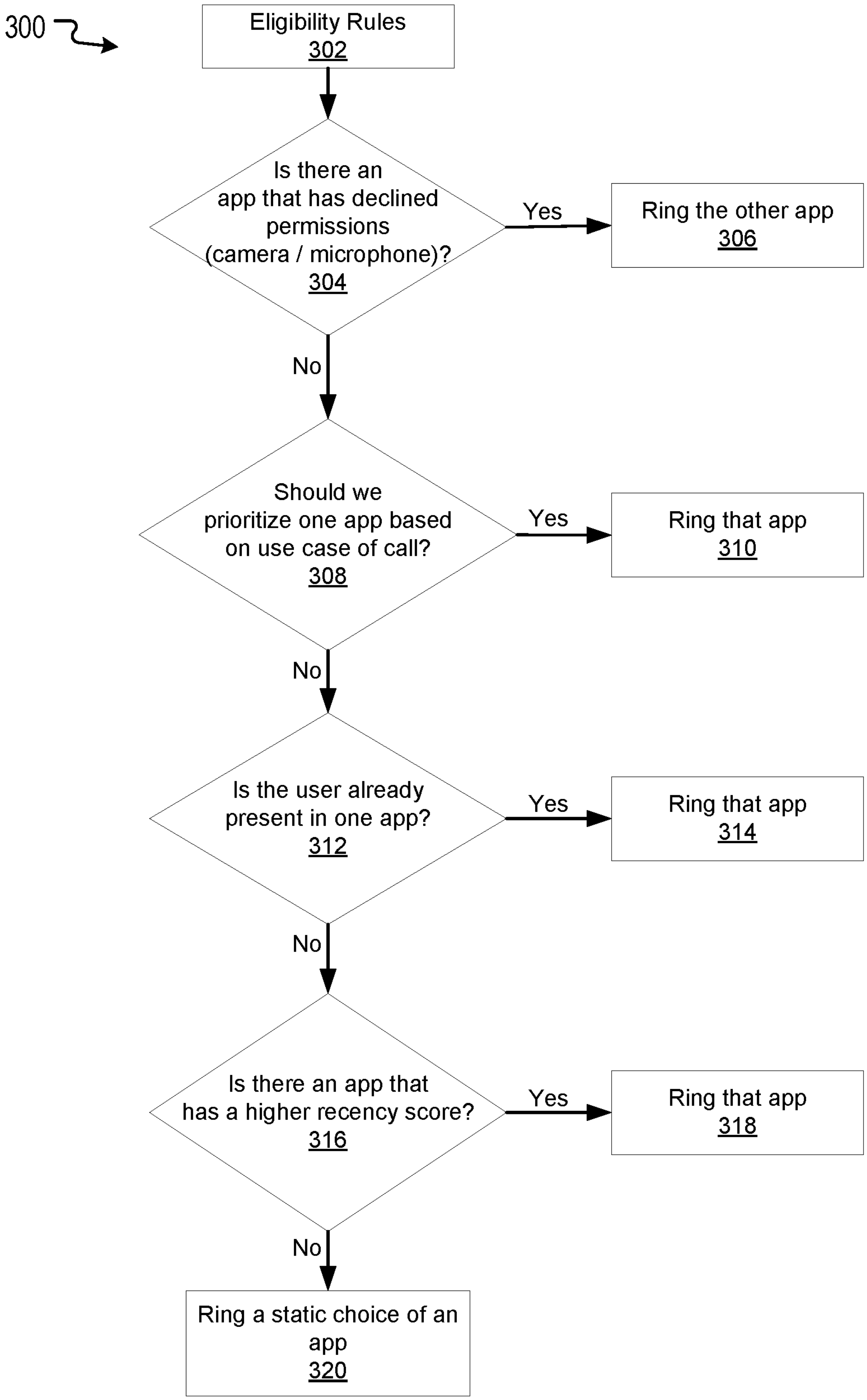
FIG. 3A illustrates an example flow, according to an embodiment of the present technology.

FIG. 3A illustrates an example flow 300 to selectively determine an application of a plurality of applications with calling functionality of a computing device of a user (or callee) to ring for an incoming call initiated by a caller, according to an embodiment of the present technology. In some embodiments, the flow 300 can be performed or implemented by the call ringing module 104 of the decisioning module 102. At 302, eligibility rules can be checked. For example, the eligibility rules may dictate that only one application is eligible to be rung on the computing device for the incoming call. The flow 300 can proceed to 304. At 304, it can be determined if there is an application that has declined permissions to use a camera, microphone, or other communication capability of the computing device. If there is an application that has declined permissions to use a camera, microphone, or other communication capability of the computing device, the flow 300 can proceed to 306. At 306, an application other than the application that has declined such permissions is selected to ring for the incoming call. If there is no application that has declined permissions to use a camera, microphone, or other communication capability of the computing device, the flow 300 can proceed to 308.

At 308, it can be determined if an application should be prioritized over one or more other applications based on a use case of the incoming call. In one example, a use case of a call can be a specific scenario, context, or user experience associated with an application initiating the call to which the call should be limited. For instance, if a call is initiated from a first application of a computing device of a caller using or based on certain data (e.g., user data) that should not be shared with a second application, the incoming call should be rung on the first application on the computing device of the user, not the second application. As another example, assume that a call is initiated from a first application of a computing device of a caller that is associated with a specific scenario, context, or user experience. Assume further that a second application of a computing device of the user is associated with a specific scenario, context, or user experience that conflicts or is inconsistent with the specific scenario, context, or user experience associated with the first application. In this example, a first application associated with a specific scenario, context, or user experience of the computing device of the user that is consistent with the first application of the computing device of the caller can be prioritized over the second application of the computing device of the user.

If an application should be prioritized over one or more other applications based on a use case of the incoming call, the flow 300 can proceed to 310. At 310, the application that should be prioritized based on the use case can be rung for the incoming call. If an application should not be prioritized over one or more other applications based on the use case of the incoming call, the flow 300 can proceed to 312. At 312, it can be determined if the user is present or active in one application. If the user is present or active in the application, the flow 300 can proceed to 314. At 314, the application in which the user is present or active can be rung for the incoming call. If the user is not present or active in the application, the flow 300 can proceed to 316. At 316, the flow 300 can determine if there is an application that has a higher recency score than other applications. A recency score for an application can be based on a variety of considerations relating to usage of the application by a user. For example, the recency score for a first application can be based on a ratio between how many times the first application was used by the user versus how many times a second application was used by the user during a selected duration of time. The recency score can be weighted by the recency of usage of an application. In this regard, the recency score can be increased when usage of an application was relatively more recent in time instead of relatively more distant in time. The recency score also can be weighted by duration of usage of an application. For example, the recency score can be increased when usage of the application occurred during a longer window of time. If an application has a higher recency score than other applications, the flow 300 can proceed to 318. At 318, the application having the higher recency score can be rung for the incoming call. If an application does not have a higher recency score, the flow 300 can proceed to 320. At 320, a static choice of an application can be rung for the incoming call. In this regard, the static choice of the application can be determined by an entity in control of the decisioning module 102. For example, A/B testing can be performed to determine a subpopulation of callees who will be selected to receive incoming calls on a particular application while the remainder of the population is rung on another application. In this way, behavior of users in relation to the application rung can be better understood, allowing improvement in and optimization of the functionality of the decisioning module 102.

Figure 3B:
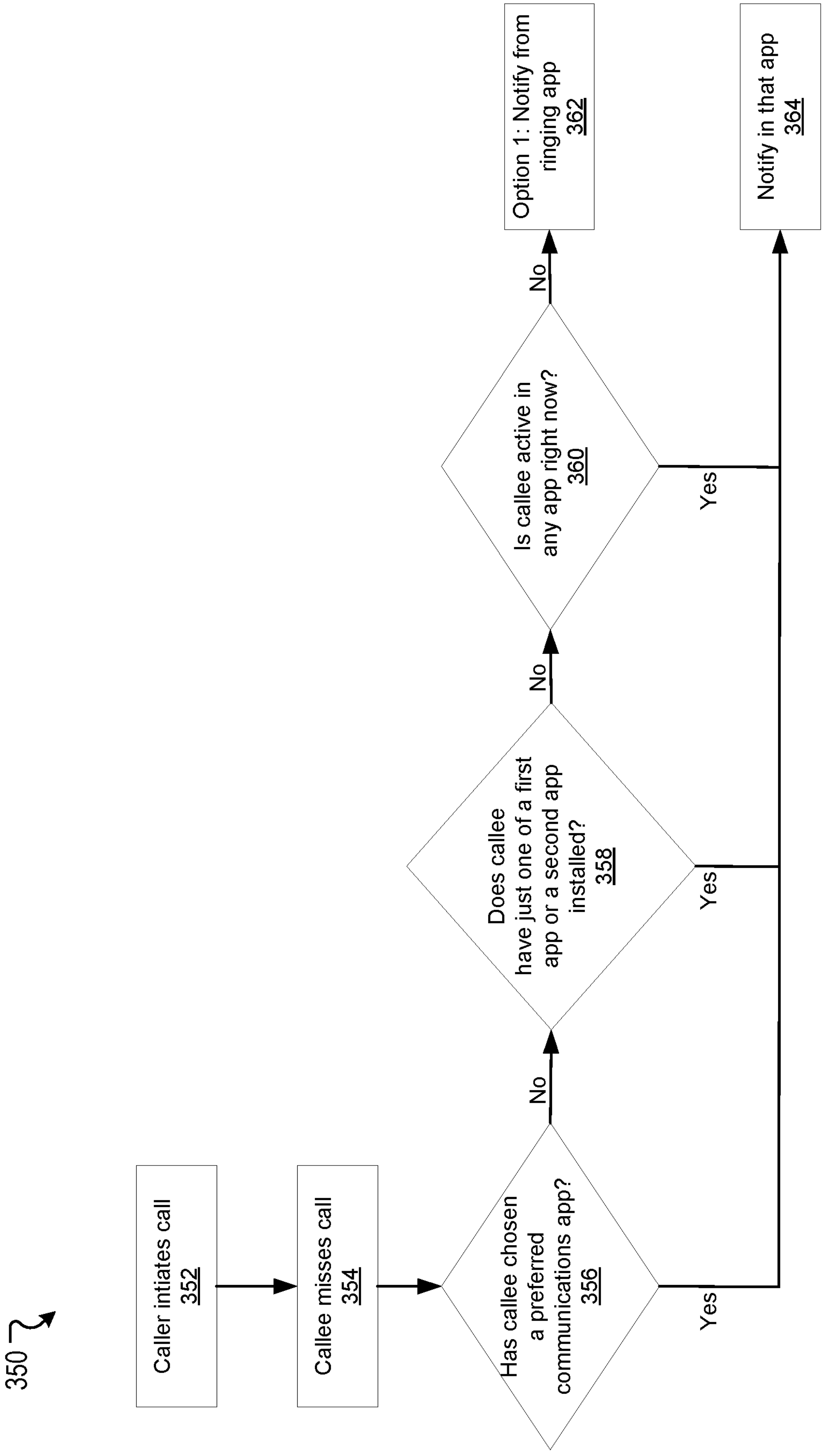
FIG. 3B illustrates an example flow, according to an embodiment of the present technology.

FIG. 3B illustrates an example flow 350 to selectively determine an application of a plurality of applications with calling functionality of a computing device of a user (or callee) through which to notify about a missed call, according to an embodiment of the present technology. In some embodiments, the flow 350 can be performed or implemented by the missed call notification module 106 of the decisioning module 102. At 352, a call from a caller and directed to a callee can be received. At 354, the incoming call to the callee can be missed. In this regard, the callee can fail to pick up the incoming call. The flow 350 can proceed in a manner that is similar to the flow 200, as described in more detail herein.

A missed call notification can be delivered in various manners. In some embodiments, a missed call notification can be provided through the same application of a plurality of applications of a computing device that was rung for an incoming call that was missed. In some embodiments, a missed call notification can be provided through the same application of a plurality of applications of a computing device that was rung for an incoming call and on the same computing device(s) of a plurality of computing devices associated with a user that was rung for the incoming call. In some embodiments, a missed call notification can be provided through an application specified by a user to provide notifications. In some embodiments, a missed call notification can be provided on an application of a computing device of the callee that is different from an application of the computing device that was rung for the incoming call that was missed. As just one example, assume a user has not specified a preferred communications application and has more than one application having call functionality installed on a computing device of the user. In this example, if the user is active on a first application during a first time period during which a call for the user is incoming, the first application can be rung in accordance with the flow 200. If the user does not pick up the incoming call, then a missed call notification can be provided to the user. If the missed call notification associated with the missed call is to be delivered at a second time period, which is different from the first time period, when the user is active on a second application, then the missed call notification can be provided on the second application in accordance with the flow 200 or the flow 350. Other variations are possible.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated. At block 502, the example method 500 can receive an incoming call. At block 504, the example method 500 can select an application of a plurality of applications having calling functionality and installed on a computing device of a user to provide at least one of a notification of the incoming call or a notification of a missed call associated with the incoming call. At block 506, the example method 500 can cause the application to provide at least one of the notification of the incoming call or the notification of the missed call.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
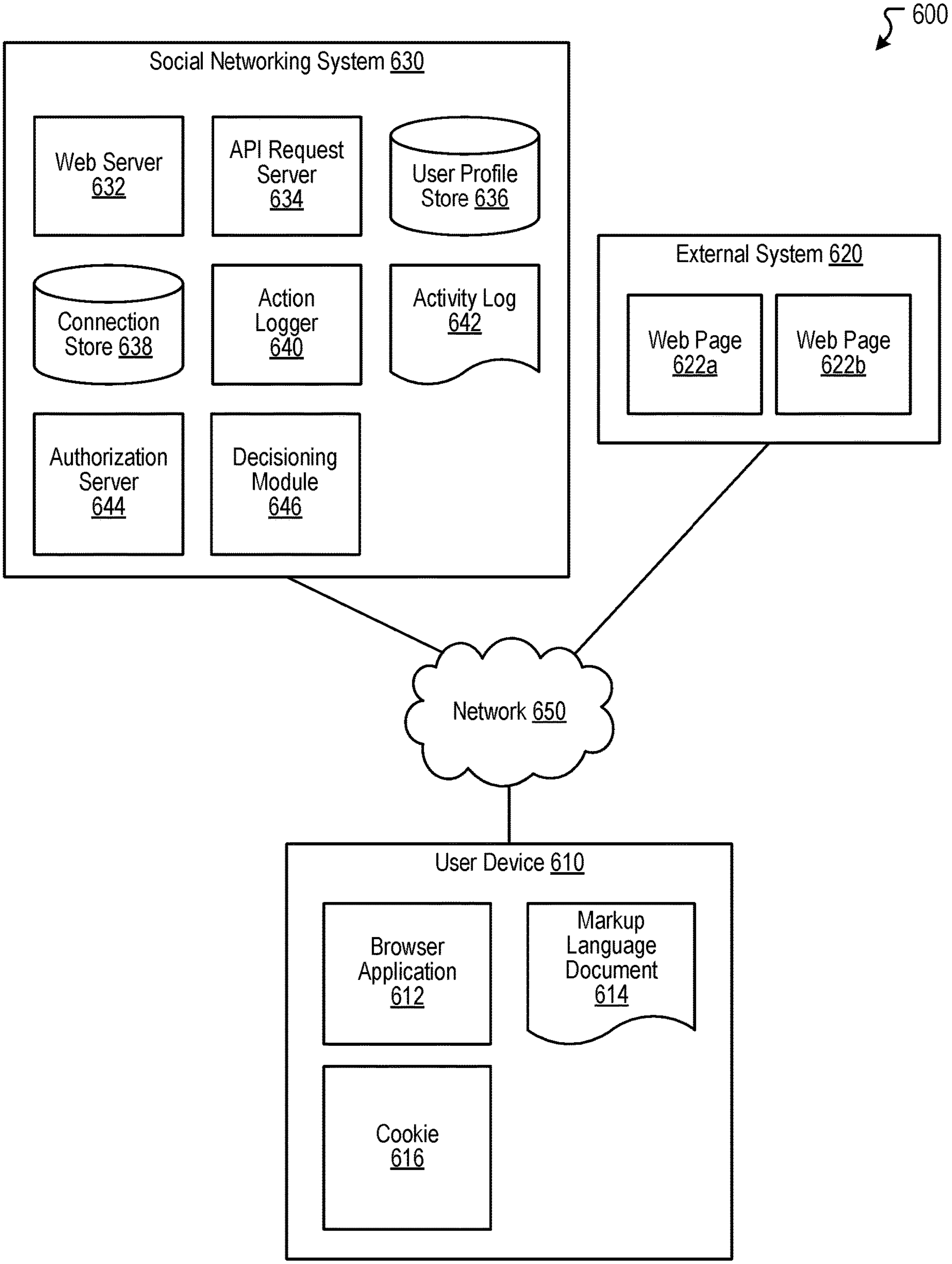
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a decisioning module 646. The decisioning module 646 can be implemented with the decisioning module 102, as discussed in more detail herein. In various embodiments, some or all functionality of the decisioning module 102 can be additionally or alternatively implemented by the user device 610. It should be appreciated that there can be many variations or other possibilities.

Hardware Implementation

Figure 7:
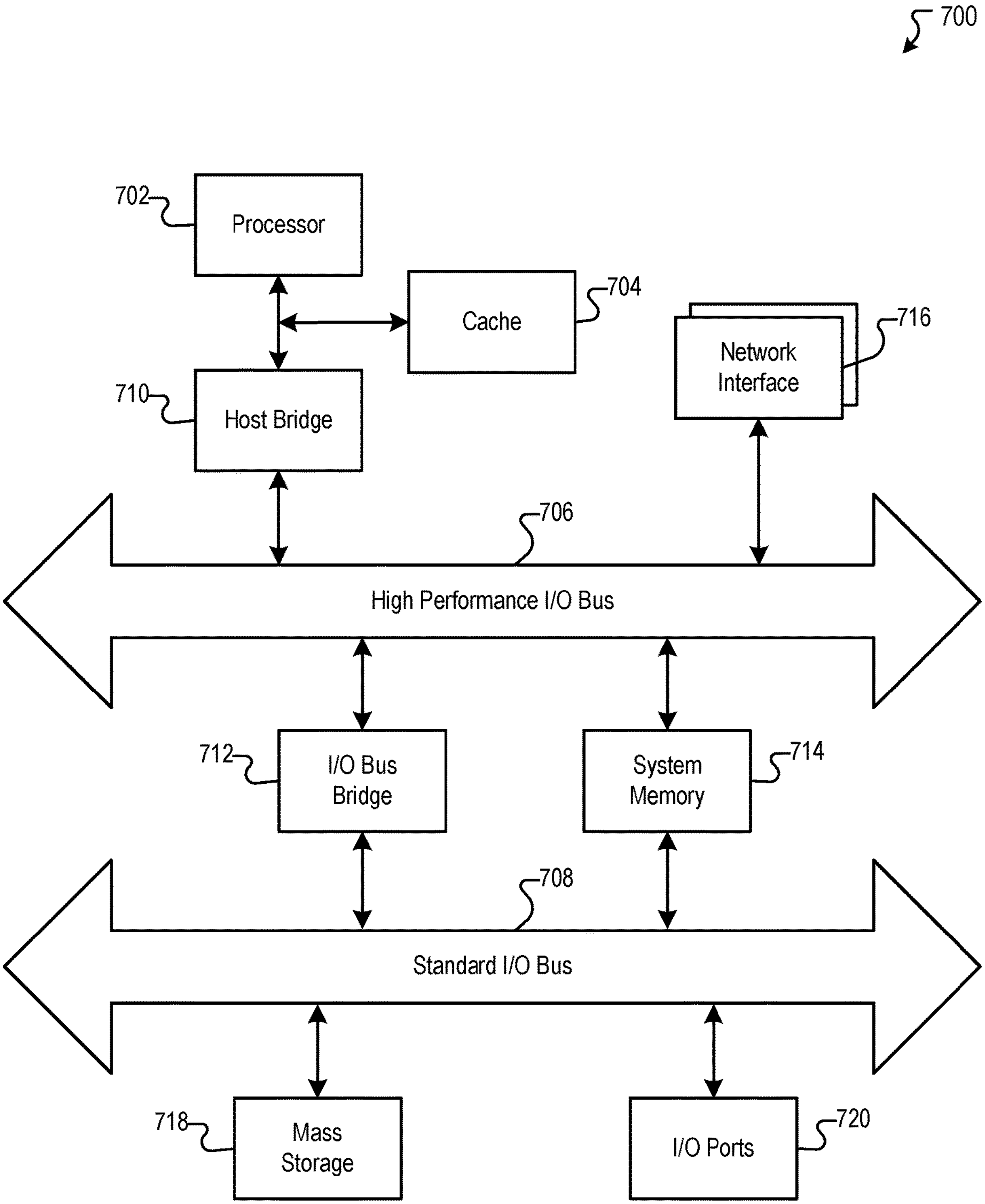
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

receiving, by a computing system, an incoming call;

selecting, by the computing system, an application of a plurality of applications having calling functionality and installed on a computing device of a user to provide at least one of a notification of the incoming call or a notification of a missed call associated with the incoming call, wherein selecting the application comprises:

determining that the user has not specified a preferred application of the plurality of applications;

in response to determining that the user has not specified the preferred application, determining that the user is not active in an application of the plurality of applications; and in response to determining that the user is not active in the application, determining that the application to provide at least one of the notification of the incoming call or the notification of the missed call is an application through which the incoming call was initiated on a computing device of a caller; and causing, by the computing system, the application to provide at least one of the notification of the incoming call or the notification of the missed call.

2. The computer-implemented method of claim 1, wherein the selecting an application of the plurality of applications comprises:

determining, by the computing system, that the user has just one of a first application or a second application installed on the computing device, wherein the application to provide at least one of the notification of the incoming call or the notification of the missed call is the installed application of the first application or the second application.

3. The computer-implemented method of claim 1, further comprising at least one of:

determining, by the computing system, that the user has both a first application and a second application installed on the computing device; or determining, by the computing system, that the user is active in the first application, wherein the application to provide at least one of the notification of the incoming call or the notification of the missed call is an application through which the incoming call was initiated on a computing device of a caller.

4. The computer-implemented method of claim 1, wherein the selecting an application of the plurality of applications comprises:

determining, by the computing system, if an application has permission to use at least one of a camera or a microphone, wherein the application to provide at least one of the notification of the incoming call or the notification of the missed call is the application having the permission to use at least one of the camera or the microphone.

5. The computer-implemented method of claim 1, wherein the selecting an application of the plurality of applications comprises:

determining, by the computing system, if an application has a higher recency score in comparison to other applications, wherein the application to provide at least one of the notification of the incoming call or the notification of the missed call is the application having the higher recency score.

6. The computer-implemented method of claim 1, wherein the selecting an application of the plurality of applications comprises:

determining, by the computing system, if an application is consistent with a use case of an application that initiated the incoming call, wherein the application to provide at least one of the notification of the incoming call or the notification of the missed call is the application that is consistent with the use case of the application that initiated the incoming call.

7. The computer-implemented method of claim 1, wherein the causing the application to provide at least one of the notification of the incoming call or the notification of the missed call comprises:

causing, by the computing system, provision of the notification of the incoming call on a first application of the plurality of applications; and causing, by the computing system, provision of the notification of the missed call on a second application of the plurality of applications.

8. The computer-implemented method of claim 1, wherein the notification of the incoming call is a ring.

9. A system comprising:

at least one processor; and memory storing instructions that, when executed by the at least one processor, cause the system to perform operations comprising:

receiving an incoming call;

selecting an application of a plurality of applications having calling functionality and installed on a computing device of a user to provide at least one of a notification of the incoming call or a notification of a missed call associated with the incoming call, wherein selecting the application comprises:

determining that the user has not specified a preferred application of the plurality of applications;

in response to determining that the user has not specified the preferred application, determining that the user is not active in an application of the plurality of applications; and in response to determining that the user is not active in the application, determining that the application to provide at least one of the notification of the incoming call or the notification of the missed call is an application through which the incoming call was initiated on a computing device of a caller; and causing the application to provide at least one of the notification of the incoming call or the notification of the missed call.

10. The system of claim 9, wherein the selecting an application of the plurality of applications comprises:

determining that the user has just one of a first application or a second application installed on the computing device, wherein the application to provide at least one of the notification of the incoming call or the notification of the missed call is the installed application of the first application or the second application.

11. The system of claim 9, further comprising at least one of:

determining that the user has both of a first application and a second application installed on the computing device; or determining that the user is active in the first application, wherein the application to provide at least one of the notification of the incoming call or the notification of the missed call is an application through which the incoming call was initiated on a computing device of a caller.

12. A non-transitory computer-readable storage medium including instructions that, when executed by at least one processor of a computing system, cause the computing system to perform operations comprising:

receiving an incoming call;

selecting an application of a plurality of applications having calling functionality and installed on a computing device of a user to provide at least one of a notification of the incoming call or a notification of a missed call associated with the incoming call, wherein selecting the application comprises:

determining that the user has not specified a preferred application of the plurality of applications;

in response to determining that the user has not specified the preferred application, determining that the user is not active in an application of the plurality of applications; and in response to determining that the user is not active in the application, determining that the application to provide at least one of the notification of the incoming call or the notification of the missed call is an application through which the incoming call was initiated on a computing device of a caller; and causing the application to provide at least one of the notification of the incoming call or the notification of the missed call.

13. The non-transitory computer-readable storage medium of claim 12, wherein the selecting an application of the plurality of applications comprises:

determining that the user has just one of a first application or a second application installed on the computing device, wherein the application to provide at least one of the notification of the incoming call or the notification of the missed call is the installed application of the first application or the second application.

14. The non-transitory computer-readable storage medium of claim 12, further comprising at least one of:

determining that the user has both a first application and a second application installed on the computing device; or determining that the user is active in the application, wherein the application to provide at least one of the notification of the incoming call or the notification of the missed call is an application through which the incoming call was initiated on a computing device of a caller.

* * * * *